July 29, 1930. L. L. SHERWOOD 1,771,658
CERTIFICATE HOLDER
Filed May 16, 1928
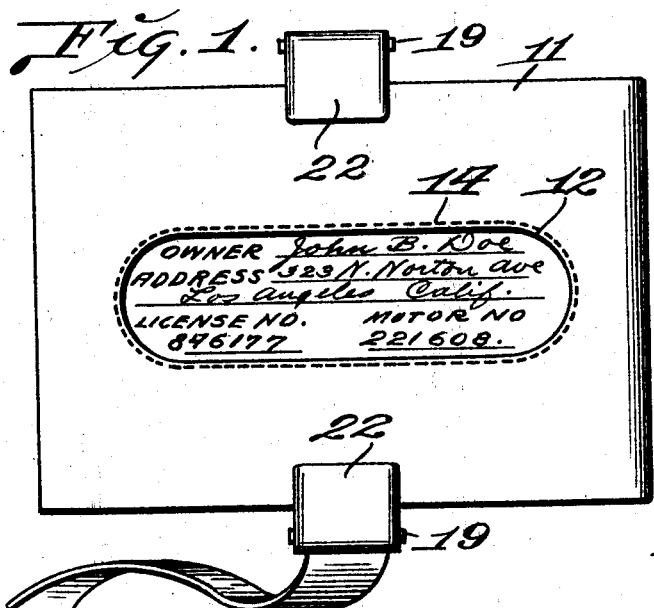
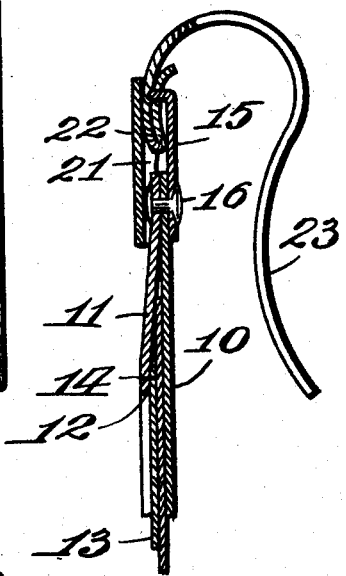
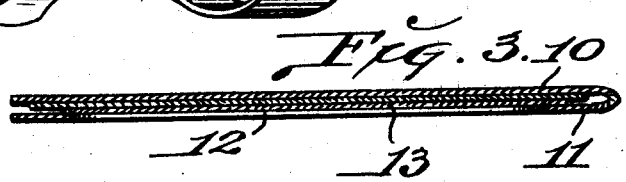
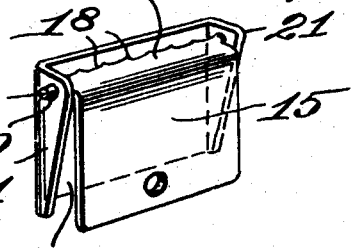
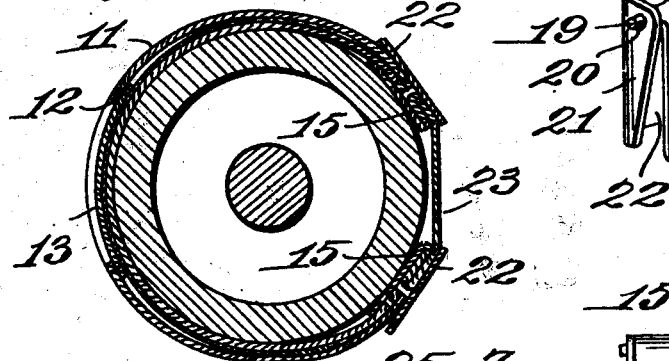
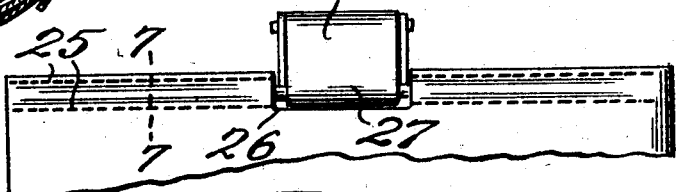
INVENTOR,
L. L. SHERWOOD.
By Martin C. Smith, ATTY.

Patented July 29, 1930

1,771,658

UNITED STATES PATENT OFFICE

LESTER L. SHERWOOD, OF LOS ANGELES, CALIFORNIA

CERTIFICATE HOLDER

Application filed May 16, 1928. Serial No. 278,085.

My invention relates to an improved holder for identification certificates and the like that are now generally required by state laws and city ordinances to be carried by and displayed upon motor vehicles.

My present invention is an improvement on the certificate holders forming the subject-matter of an application for patent filed by me August 4, 1925, Serial Number 48,098, and U. S. Letters Patent No. 1,671,554, issued to me May 29th, 1928.

The principal objects of my present invention are to generally improve and simplify the construction of the certificate holders disclosed in my aforesaid Letters Patent and copending application, as well as other types of certificate holders, to provide a certificate holder that is relatively simple in construction, inexpensive of manufacture, and which may be easily and quickly applied to the steering post or column of an automobile where it will hold and display in convenient manner the certificate bearing data relating to the automobile in order that said data may be readily observed by traffic officers or other persons who might have occasion to ascertain the identity and license number of the operator or owner of the vehicle.

A further object of my invention is to provide means for reinforcing the certificate holder so that the same will, under all conditions, lie flat against the steering post or column to which it is applied, and further to provide improved means for securing the holder in position upon the steering column or like part of a motor vehicle, and which securing means may be readily adjusted so as to be fitted on to columns of different sizes, and said attaching means being constructed and arranged so that it lies flat against the column and thereby eliminate projecting parts that might interfere with the clothing or movements of the occupants of the automobile.

With the foregoing and other objects in view, my invention consists in certain novel features of construction and arrangement of parts that will hereinafter be more fully described and claimed and illustrated in the accompanying drawing, in which—

Fig. 1 is a front elevational view of a certificate holder of my improved construction, in open flat condition before being applied to a vehicle steering column or the like.

Fig. 2 is an enlarged vertical section taken on the line 2—2 of Fig. 1.

Fig. 3 is a longitudinal section taken through the center of the holder.

Fig. 4 is a perspective view of one of the buckles utilized as a part of the fastening means for my improved holder.

Fig. 5 is a sectional view of the steering post or column of an automobile and showing my improved holder in position thereupon.

Fig. 6 is a detail elevational view of a modified form of the holder.

Fig. 7 is an enlarged cross section taken on the line 7—7 of Fig. 6.

Referring by numerals to the accompanying drawings which illustrate a practical embodiment of my invention, 10 designates the rear wall of the holder and 11 the front wall thereof, said walls being formed of suitable flexible material such as leather, rubberized fabric, composition or the like, and said walls being of equal width and length and integrally connected at one end. In other words the front and rear walls are formed from a single piece of flexible material that is bent double on a transverse line at its center, thereby forming said front and rear walls.

Formed in the central portion of the front wall 11 is an elongated opening 12 and arranged against the inner face of said front wall and covering this opening is a section 13 of thin transparent material, such as celluloid, thereby forming a window or sight opening in said front wall through which the enclosed certificate may be readily observed. The edge of the flexible transparent member 13 is secured to the front wall 11 around the edge opening 12 therein, in any suitable manner, preferably by a row 14 of stitching.

Arranged midway between the ends of the body of the holder and at the upper and lower edges thereof, are buckles that are utilized in connection with a strap for securing the holder in position on an automobile part, such as a steering column, and each buckle comprises a rear plate 15 that is secured to the body of the holder by one or more rivets, such as 16, the same passing through the plate 15, and through the edges of the front and rear walls 10 and 11, and thus the same fastening means that is utilized for attaching the buckles to the body of the holder fastens the edges of the front and rear walls to each other at points intermediate their ends.

The outer edge of each plate, or that edge that projects beyond the edges of the front and rear walls 10 and 11, is bent at right angles to form a lip or flange 17, and the edge thereof is serrated as designated by 18.

Formed integral with and projecting outwardly from the ends of the lip or flange 17 are short pintles 19 that are journaled in apertures 20, the latter being formed in wings 21 that are bent rearwardly from a front plate 22, and which latter occupies a position immediately in front of plate 15.

The buckles located on the central portions of the upper and lower edges of the holder are adapted to clamp the end portions of a short strap 23 of leather, rubberized fabric, or analogous material.

In the use of my improved holder the certificate bearing the required data relating to the vehicle upon which the certificate is carried and data relating to the owner or operator of the vehicle is inserted in the open end of the holder so as to occupy a position between the front and rear walls thereof, and thus certain of the data on the central portion of the certificate is plainly visible through the window in the front wall of the holder.

The holder is now applied to the steering column of the vehicle, and as it must be curved to conform to the shape of said steering column the enclosed certificate will be very firmly clamped between the front and rear walls of the holder and by clamping the ends of the strap 23 between the serrated edges of the flanges 17 and the front plates 22 the certificate is firmly secured in position upon the steering column.

In order that there may be no part of the device that projects a substantial distance from the holder the ends of strap 23 may fold upon themselves as illustrated in Figs. 2 and 5, and said folded ends clamped between the serrated edges 18 of the flange 17 and the adjacent portions of the plates 22, with the terminal portions of said straps on the inside, and thus when the front plates 22 are swung down into clamping position a practically smooth outer surface is produced with the result that there will be no interference between the holder and the occupants of the vehicle with which said holder is associated.

In Fig. 6 I have illustrated a modified construction wherein the upper and lower edges of the holder are reinforced by small wire rods 24 that are disposed between the front and rear walls of the holder adjacent to their upper and lower edges and said rods being firmly retained in position by rows of stitching 25 that pass through the front and rear walls above and below the reinforcing rod, and which rows of stitches are parallel with the adjacent edge of the holder.

Where this construction is provided, portions of the front and rear walls of the holder are cut away at intermediate points, as designated by 26, thereby exposing the central portion of the rod and the lower end of the rear plate 15ª of the buckle is bent or looped around the exposed portion of the rod, as designated by 27.

Thus it will be seen that I have provided an automobile certificate holder that is relatively simple in construction, inexpensive of manufacture, and very effective in performing the functions for which it is intended.

An especially desirable feature of my improved construction is the attaching of the buckles to the upper and lower edges of the body of the holder by rivets or the like, and utilizing said rivets in securing the intermediate portions of the edges of the front and rear walls of the holder to each other, such construction being relatively simple, easily and cheaply accomplished, and very effective in results.

A further desirable feature of the invention is the utilization of comparatively flat buckles and a strap for securing the holder to the steering post or like automobile member so that said holder, when properly applied to the steering column, presents a neat and finished appearance without undue projecting portions.

It will be understood that minor changes in the size, form and construction of the various parts of my improved certificate holder may be made and substituted for those herein shown and described without departing from the spirit of my invention, the scope of which is set forth in the appended claims.

I claim as my invention:

1. A certificate holder, comprising a single piece of flexible material bent double so as to form front and rear walls of equal size, a window formed in the central portion of the front wall, a two part buckle arranged on the upper edge of the holder at a point midway between its ends, the rear part of which buckle is positioned against the rear face of the rear wall of the holder, a single fastening element passing through the rear part of said buckle and through the adjacent portions of the front and rear walls of the holder, the front part of the buckle being hinged to the rear part at a point beyond the edges of the front and rear walls of the holder and a strap detachably engaged by said buckle.

2. A certificate holder, comprising a single piece of flexible material bent double so as to form front and rear walls of equal size, a window formed in the central portion of the front wall, a two part buckle arranged on the upper edge of the holder at a point midway between its ends, the rear part of which buckle is positioned against the rear face of the rear wall of the holder, a single fastening element passing through the rear part of said buckle and through the adjacent portions of the front and rear walls of the holder, the front part of the buckle being hinged to the rear part at a point beyond the edges of the front and rear walls of the holder, a strap detachably engaged by said buckle and means for detachably connecting the opposite end of said strap to the opposite edges of the walls of the holder.

3. A certificate holder, comprising a single piece of flexible material bent double so as to form front and rear walls of equal size, a window formed in the central portion of the front wall, a two part buckle arranged on the upper edge of the holder at a point midway between its ends, the rear part of which buckle is positioned against the rear face of the rear wall of the holder, a single fastening element passing through the rear part of said buckle and through the adjacent portions of the front and rear walls of the holder, the front part of the buckle being hinged to the rear part at a point beyond the edges of the front and rear walls of the holder, a strap detachably engaged by said buckle, a two part buckle arranged on the lower edge of the holder at a point midway between the ends thereof, the rear part of which buckle is positioned against the rear face of the rear wall of the holder, a single fastening element passing through the rear portion of the buckle and through the adjacent portions of the walls of the holder and the front part of which buckle is hinged to the rear part at a point beyond the adjacent edges of the walls of the holder.

In testimony whereof I affix my signature.

LESTER L. SHERWOOD.